United States Patent [19]

Deppert et al.

[11] Patent Number: 4,987,826
[45] Date of Patent: Jan. 29, 1991

[54] CYLINDER PISTON ROD UNIT

[75] Inventors: Norbert Deppert, Gochsheim; Helmut Umlauf, Schweinfurt, both of Fed. Rep. of Germany

[73] Assignee: Fichtel & Sachs AG, Schweinfurt, Fed. Rep. of Germany

[21] Appl. No.: 404,120

[22] Filed: Sep. 7, 1989

[30] Foreign Application Priority Data

Sep. 17, 1988 [DE] Fed. Rep. of Germany ....... 3831719

[51] Int. Cl.⁵ .............................................. F16J 15/18
[52] U.S. Cl. ................... 92/168; 92/165 R; 92/171.1; 277/152; 277/188 R
[58] Field of Search .................. 92/165, 168 R, 171.1; 277/152, 153, 188 R

[56] References Cited

U.S. PATENT DOCUMENTS

| | | | |
|---|---|---|---|
| 2,329,028 | 9/1943 | Austin | 277/152 |
| 2,631,906 | 3/1953 | Brook | 277/152 |
| 2,798,778 | 6/1957 | Flick | 92/168 R |
| 4,201,310 | 5/1980 | Glachet | 277/152 |
| 4,211,152 | 7/1980 | Colletti et al. | 92/168 R |
| 4,384,511 | 5/1983 | Meffero | 92/168 R |
| 4,508,020 | 4/1985 | Szcypak | 92/168 R |
| 4,576,382 | 3/1986 | Scharting et al. | 277/152 |
| 4,736,824 | 4/1988 | Dony et al. | 92/168 R |

Primary Examiner—Ronald C. Capossela
Attorney, Agent, or Firm—Brumbaugh, Graves, Donohue & Raymond

[57] ABSTRACT

A cylinder-piston rod unit includes a sealing ring adjacent at least one end of the cylinder for forming a fluid-tight seal between the cylinder and the piston rod. The sealing ring includes a substantially axially extending sleeve portion and a substantially radially extending flange portion. A sealing-pressure application ring, which is subject to a circumferential tensioning force over at least the lower part of the operating temperature range of the sleeve portion, surrounds the sleeve portion and exerts a radial sealing force against the sleeve portion. The sealing ring is secured to the cylinder by the flange portion.

24 Claims, 5 Drawing Sheets

FIG.9 ly the Invention is to provide a
CYLINDER PISTON ROD UNIT

BACKGROUND OF THE INVENTION

Cylinder piston rod units are used for many technical applications and more particularly in the field of motor-vehicles. In this latter field, cylinder piston rod units are e.g. used as gas springs and more particularly as oscillation dampers. Motor-vehicles are used under considerably varying operational temperatures. The operational temperature is not only dependent on the surrounding temperature conditions, but also on the temperature increase which results from operation. So, oscillation dampers of motor-vehicles are frequently subject to a range of operational temperatures which varies between −40° C. and +180° C. It is required that the sealing effect between the piston rod member and the piston rod guiding and sealing unit adjacent one end of a cylinder is maintained within such a wide range of operational temperatures.

STATEMENT OF THE PRIOR ART

Piston rod sealing arrangements are known in which a sealing sleeve of a sealing ring is radially inwardly loaded against the cylindrical external surface of a piston rod by a circular helical tensional spring. These known sealing arrangements are used under highly varying temperature conditions. On the one hand, the operational temperatures may be very low, e.g. −40° C., in northern countries On the other hand, the operational temperatures may be as high as +180° C. in southern countries under heavy duty operational conditions. It is difficult to obtain the necessary sealing effect with usual fluorine caoutchouc sealing rings at low temperatures. The disadvantage of helical tensional springs acting onto the sealing sleeve is that one must provide an extremely which tensional pre-stressing force in the helical spring in order to obtain a sufficiently high sealing pressure between the sealing sleeve and the piston rod at low operational temperatures, when the fluorine caoutchouc material of the sealing sleeve is stiff and a high radial sealing pressure is necessary for obtaining a sealing effect at all between the sealing sleeve and the cylindrical external surface of the piston rod. On the other hand, when such a highly pre-stressed helical tensional spring is used under increased temperature, e.g. in southern countries or under heavy duty operational conditions, which results in an increase of damping fluid temperature, the spring remains under substantial tensional pre-stress with the result that the weakened material of the sealing sleeve is still pressed with high radial pressure against the circular external surface of the reciprocating piston rod. This is undesirable because the material of the sealing sleeve is in such case subject to heavy wear.

To avoid the disadvantages of sealing arrangements with circular tensional helical springs acting onto a sealing sleeve, one has already used arrangements with a plurality of axially subsequent sealing rings and has provided an axial pre-stress for the respective sealing springs. Such sealing arrangements are very complicated and expensive due to the plurality of components. Moreover, a high friction exists between such sealing arrangements and the piston rod. In spite of these complicated sealing arrangements, one has frequently found unexplainable leakage effects with such sealing arrangements.

OBJECT OF THE INVENTION

The object of the present invention is to provide a cylinder piston rod unit with a sealing arrangement of simple and reliable design, which warrants a sufficient sealing effect in a wide range of operational temperatures of e.g. between −40° C. and +180° C.

SUMMARY OF THE INVENTION

A cylinder piston rod unit comprises a cylinder member having an axis and two ends. A piston rod guiding and sealing unit is provided adjacent at least one of said two ends. A piston rod member axially extends through said piston rod guiding and sealing unit.

The piston rod guiding and sealing unit comprises at least one sealing ring member. This sealing ring member is axially fastened with respect to said one end of said cylinder member. The sealing ring member has an axially extending sealing sleeve portion of elastomeric material surrounding the piston rod member. The sealing sleeve portion has a radially inner sealing face sealingly engaging an external cylindrical face of the piston rod member. A closed sealing pressure application ring is mounted on said sealing sleeve portion radially outwards of the radially inner sealing face. This sealing pressure application ring is free for radial movement. Further, this sealing pressure application ring is subject to a circumferential tensional force at least in the lower part of a range of respective operational temperatures of the sealing sleeve portion. This circumferential tensional force helps to maintain a radial sealing pressure between the radially inner sealing face of the sealing sleeve portion and the external cylindrical face of the piston rod member. The sealing pressure application ring is substantially non-extensible by the circumferential force occurring within the sealing pressure application ring.

With a cylinder piston rod unit as defined above, a high circular tensional force can be maintained at low temperatures due to the lack of an "elastic extension reserve", which high circular tensional force is sufficient to maintain the high radial sealing pressure which is necessary between the sealing sleeve and the cylindrical outer surface of the piston rod at low temperatures in view of the considerable stiffness of the elastomeric material of the sealing sleeve at such low temperatures. On the other hand, if the operational temperature of the sealing sleeve is increased, the circular tensional force within the sealing ring member is reduced considerably because the elastomeric material radially between the piston rod member and the sealing pressure application ring is weakened on the one hand, and because the non-extensible sealing pressure application ring has little or no "reserve of elastic constriction" So, the radial sealing pressure between the sealing sleeve and the piston rod is also considerably reduced at increased temperature and this is desirable because at increased operational temperatures of the sealing sleeve, low sealing pressure is only necessary for obtaining a good sealing effect, and a low radial sealing pressure is desired and necessary for warranting a long lifetime of the sealing sleeve.

The radial movability of the sealing pressure application ring is desirable in order to maintain a substantially uniform radial sealing pressure over the total circumference of the sealing sleeve, even when the piston rod is excentric because of manufacturing tolerances or because of deformations of the piston rod by bending loads.

While the sealing pressure application ring may be inserted within the material of the sealing sleeve portion, it is preferred to provide said sealing pressure application ring with a radially inner surface engaging a radially outer surface of the sealing sleeve portion.

In order to permit radial movement of the sealing pressure application ring, a radially outer surface of the sealing pressure application ring is radially spaced from a surrounding rigid surface of one of the cylinder member and the piston rod guiding and sealing unit.

The sealing pressure application ring may be mounted at room temperature of e.g. +20° C. with such a circular tensional force that at lower temperatures of e.g. −40° C. still higher circumferential tensional forces occur, e.g. due to thermal constriction of the sealing pressure application ring and/or the axial shrinking of the sealing sleeve portion, and the radial sealing pressure is then high enough for providing a sufficient sealing effect between the stiffened elastomeric material and the external surface of the piston rod. On the other hand, the circumferential tensional force in the sealing pressure application ring is reduced, if the operational temperature of the sealing pressure application ring is increased beyond room temperature, e.g. by the thermal expansion of the sealing pressure application ring and/or the weakening of the elastomeric material with the result of reduced sealing pressure at increased operational temperature.

The closed sealing pressure application ring may be a stiff metallic ring. It is to be noted, however, that structural stiffness of the closed sealing pressure application ring, while it may be preferable, is not absolutely necessary. It is sufficient that the sealing pressure application ring is stiff against circumferential tensional forces.

According to a preferred embodiment, the sealing sleeve portion may be made of a fluorine caoutchouc. Moreover, the sealing ring member as a total may be integrally made of an elastomeric material and preferably of a fluorine caoutchouc.

The sealing effect may be still improved by providing at least one radially inwardly directed annular sealing lip on the radially inner sealing face of the sealing sleeve portion.

The sealing ring member may have a stripper lip which is axially spaced from the radially inner sealing face of the sealing sleeve portion and also engages the external cylindrical face of the piston rod member. This stripper lip has the effect of cleaning the inwardly moving piston rod member, before the respective surface portions of the piston rod member come into engagement with the radially inner sealing face of the sealing sleeve portion.

For fastening the sealing ring member to the respective cylinder member, the sealing ring member may have a radially outwardly directed flange portion. This flange portion may be radially and axially fastened to at least one of the piston rod guiding and sealing unit and the cylinder member. This radially outwardly directed flange portion may be provided with a stiffening disc, e.g. a metallic stiffening disc. This stiffening disc should be separated, however, from the sealing pressure application ring in order to maintain the desirable free radial movability of the sealing pressure application ring.

The sealing sleeve portion is preferably extending axially inwards from the radially outwardly directed flange portion towards a cavity with the cylinder member which cavity contains e.g. a damping liquid.

While it is also possible to provide an adhesive bonding or vulcanisation bonding between the sealing pressure application ring and the sealing sleeve, it is preferred to provide a structural connection between the sealing pressure application ring and the sealing sleeve. So it is possible that the sealing pressure application ring has an annular radially inwardly directed projection and that this annular projection engages a radially outwardly open annular recess of the sealing sleeve portion. Alternatively, it is also possible that the sealing pressure application ring has a radially inwardly open annular recess and that this recess accommodates a radially outwardly directed annular projection of the sealing sleeve portion.

Besides a direct engagement of the sealing pressure application ring on the one hand and the sealing sleeve portion on the other hand, it is also possible to provide a pressure transmission ring radially between the sealing pressure application ring and the sealing sleeve portion. Such a pressure transmission ring may be accommodated in radially oppositely directed respective annular recesses of the sealing pressure application ring and the sealing sleeve portion.

The pressure transmission ring may have a circular or a rectangular cross-sectional area when regarded in a plane of section containing the axis of the cylinder member.

The pressure transmission ring may be made of elastomeric material. By the use of a pressure transmission ring between the sealing pressure application ring on the one hand and the sealing sleeve on the other hand, the adaptation of the radial sealing pressure to different operational temperatures of the sealing sleeve can still be improved. So it is possible that a pressure transmission ring with a hollow toroidal cross-sectional area is used and that this hollow cross-sectional area is filled with a temperature-sensitive filling medium. This filling medium may be selected such as to transmit an increased radial pressure to said sealing sleeve portion in the lower part of said range of operational temperatures as compared with said upper part of said range of operational temperatures.

The increased radial sealing pressure may be obtained e.g. by using a filling medium which has an increased radial stiffness in the lower part of operational temperatures and a reduced radial stiffness in the upper part of the range of operational temperatures. Alternatively, the increased radial sealing pressure may also be obtained by using a filling medium which has an increased specific volume in the lower part of the range of operational temperatures and a reduced specific volume in the upper part of the range of operational temperatures.

According to another aspect of the present invention, the pressure transmission ring may be a sheet material ring having a double leg profile when regarded in a plane of section containing the axis of the cylinder member. In such case, one of the legs may act onto the sealing pressure application ring, and the other leg may act onto the sealing sleeve portion. The legs may be elastically movable towards each other in radial direction. The sheet material ring may e.g. be a sheet metal ring. This sheet material ring may be closed or open.

The various features of the invention are discussed especially in the accompanying claims which form a part of the disclosure.

For the best understanding of the invention, its working advantages and specific effects reference is now made to the accompanying drawings and the description, in which preferred embodiments of the invention are discussed.

BRIEF DESCRIPTION OF THE DRAWINGS

The invention will be explained in greater detail below by reference to the forms of embodiment as represented in the drawings, wherein.

DETAILED DESCRIPTION OF THE PREFERRED EMBODIMENTS

Figure 1:
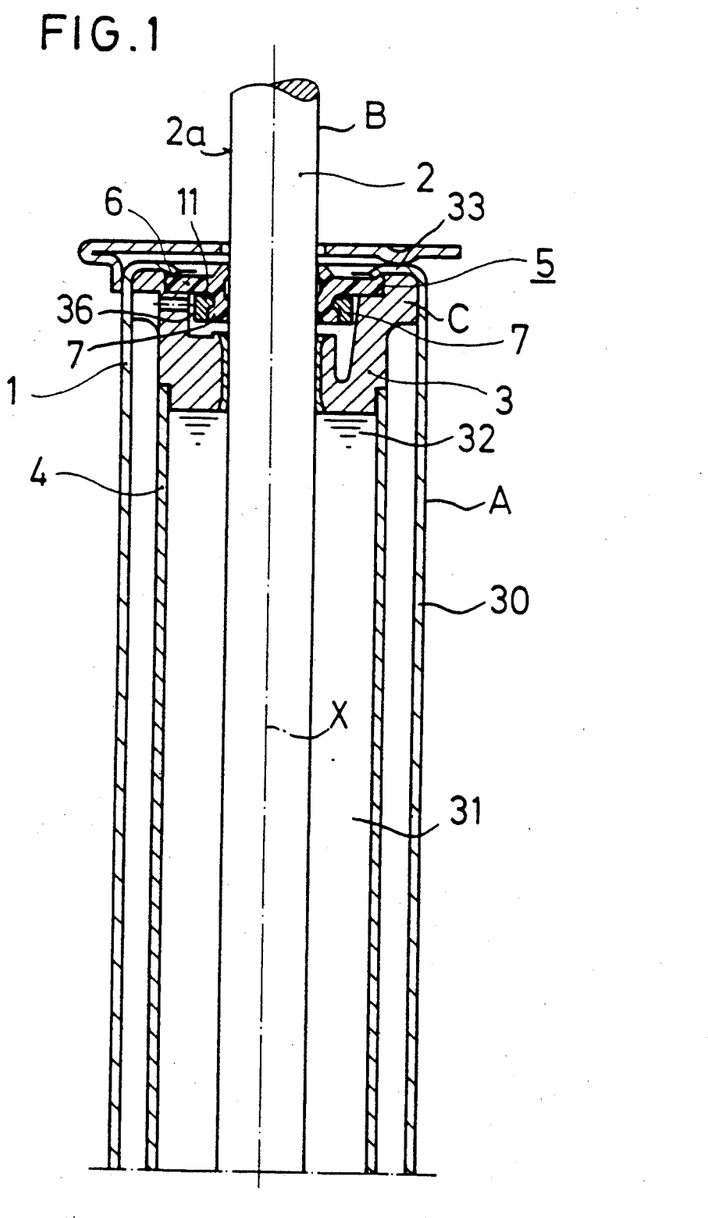
FIG. 1 shows a sealing ring arrangement between a piston - piston rod unit on the one hand and a cylinder container unit on the other hand of a shock absorber or oscillation damper.

In FIG. 1 a cylinder container unit of an oscillation damper is designated by A. A piston rod—piston unit is designated by B. The piston rod—piston unit B is axially movable with respect to the cylinder container unit A along an axis X. The piston rod—piston unit comprises a piston rod member 2. The cylinder container unit A comprises a container 30 and a cylinder 4. The cylinder 4 is provided at its upper end with a piston rod guiding and sealing unit C which centers the cylinder member 4 with respect to the container member 30. The piston rod member 2 is guided through the piston rod guiding and sealing unit C inwards and outwards the cavity 31 which is filled with a damping liquid 32.

The piston rod guiding and sealing unit C comprises a guiding member 3 and a sealing ring member 5. The sealing ring member 5 comprises a flange portion 6 and a sealing sleeve portion 7. The flange portion 6 is fastened within the guide member 3 by the upper end portion 33 of the container member 30.

The flange portion 6 is in sealing engagement with the guide member 3. The sealing sleeve portion 7 is in sealing engagement with an external cylindrical face 2a of the piston rod member 2.

Further details of the sealing ring member 5 are shown in the following figures.

Figure 2:
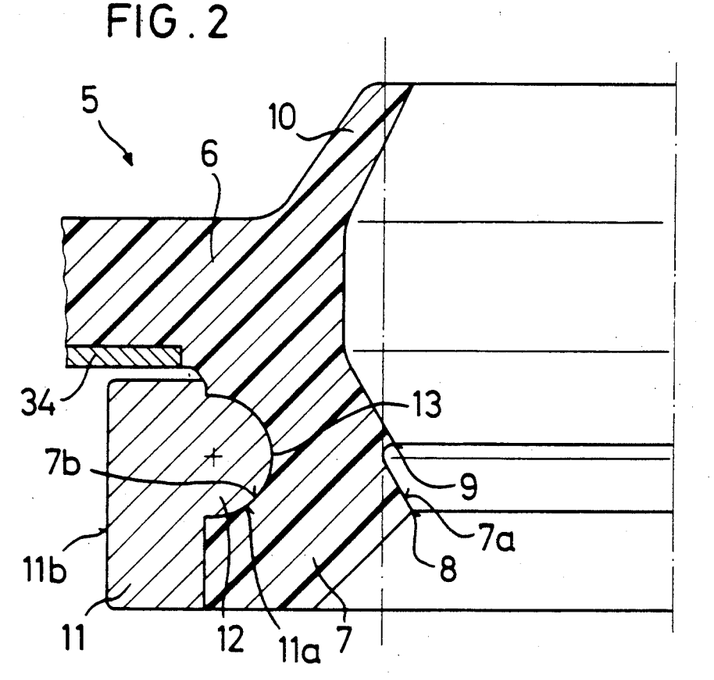
FIG. 2 shows the sealing arrangement of FIG. 1 in an enlarged illustration.

A metallic stiffening disc 34 is combined with the flange portion 6 of the sealing ring member 5. The sealing ring member 5 is made of elastomeric material and more particularly of fluorine caoutchouc.

The sealing ring member 5 comprises a stripper lip 10 which engages the surface 2a of the piston rod member 2 of FIG. 1.

The sealing sleeve portion 7 comprises a radially inner sealing face 7a with sealing edges or sealing lips 8 and 9. Moreover, the sealing sleeve portion 7 comprises a radially outer face 7b. The sealing sleeve portion 7 is made of fluorine caoutchouc. Preferably, the sealing ring member 5 is integrally made of fluorine caoutchouc.

The sealing sleeve portion 4 is surrounded by a sealing pressure application ring 11 which has a radially inner surface 11a and a radially outer surface 11b. The sealing pressure application ring 11 is made of metallic material and is circumferentially closed.

The radially inner surface 11 of the sealing pressure application ring 11 is provided with a radially inwards projecting projection 12 of annular configuration which engages into a radially outwardly open annular recess 13 of the radially outer surface 7b of the sealing sleeve portion 7.

It is to be noted that the metallic sealing pressure application ring 7 is separate from the metallic disc 34, so that the sealing pressure application ring 11 is radially movable with respect to the piston rod guide member 3 of FIG. 1. It is to be noted from FIG. 1 that a radial gap 36 is provided between the sealing pressure application ring 11 and the piston rod guide member 3.

The sealing pressure application ring 11 is closed in circumferential direction and is substantially non-extensible by the circumferential tensional forces occurring within the sealing pressure application ring 11. The radially inner sealing face 7a of the sealing sleeve portion 7 is radially pressed against the cylindrical external surface 2a of the piston rod member 2 by the presence of the sealing pressure application ring 11, particularly under cold conditions, when the fluorine caoutchouc material of the sealing sleeve portion 7 is relatively hard or stiff. So, at low temperatures of e.g. −40° C., the sealing lips or edges 8 and 9 are pressed with a high radial sealing pressure against the piston rod 2.

Figure 3:
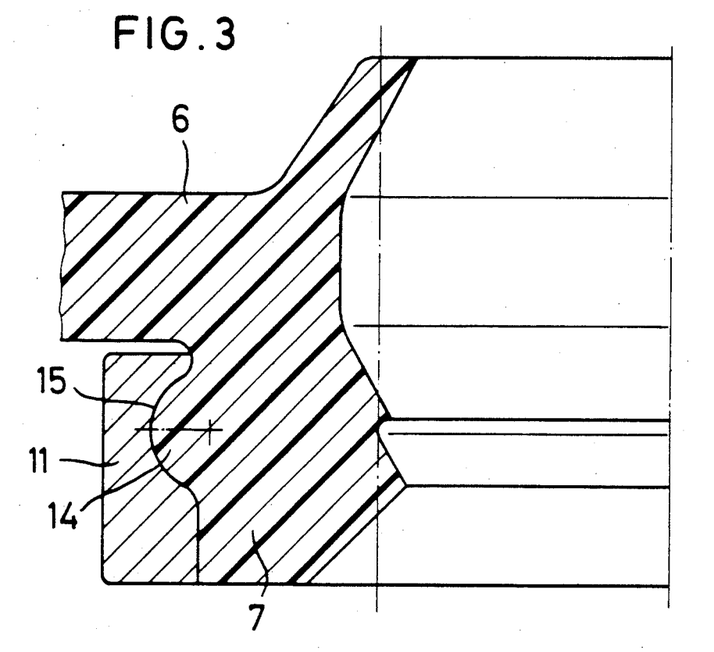
FIG. 3 shows an embodiment similar to the embodiment of FIG. 2 in which the structural engagements between the sealing sleeve portion and the sealing pressure application ring has been modified.

In the embodiment of FIG. 3, the sealing pressure application ring 11 is provided with a radially inwardly open recess 15 in which a radially outwardly/direction projection 14 of the sealing sleeve portion 7 engages, such as to connect the sealing pressure application ring 11 structurally with the sealing sleeve portion 7.

Figure 4:
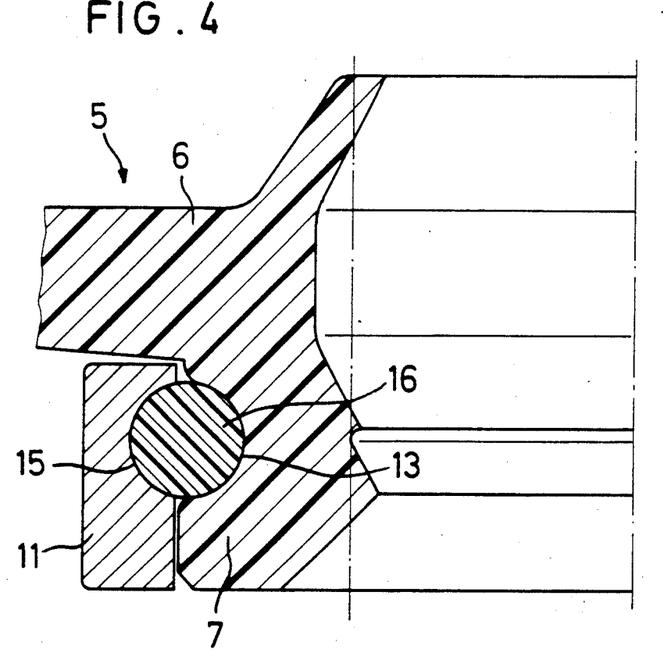
FIG. 4 shows an embodiment in which a 0-ring has been positioned between the sealing pressure application ring and the sealing sleeve portion.

In the embodiment of FIG. 4, the sealing pressure application ring 11 and the sealing sleeve portion 7 are provided with radially opposite recesses 15 and 13, respectively, which accommodate an O-ring 16 of elastomeric material. This O-ring 16 acts as a radial pressure transmission ring and further structurally connects the sealing pressure application ring 11 with the sealing sleeve portion 7.

Figure 5:
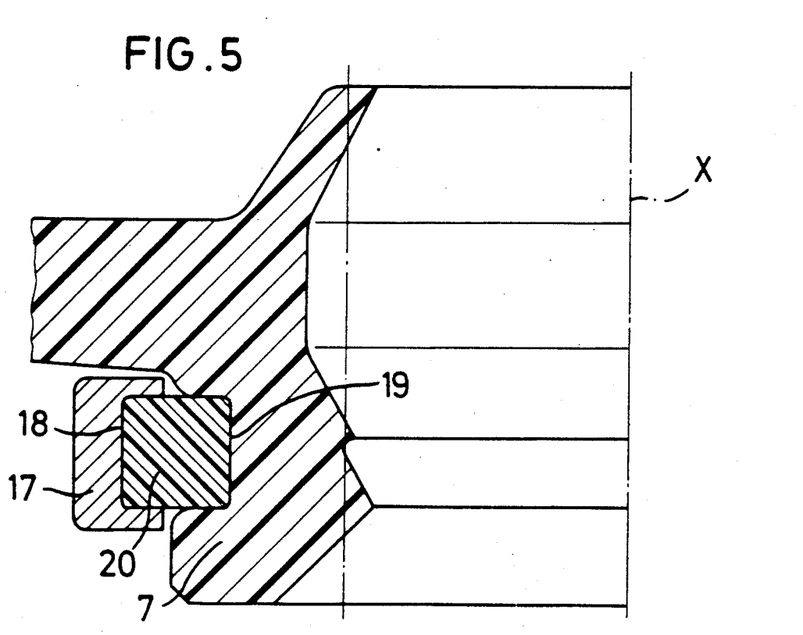
FIG. 5 shows a modification over FIG. 4 in which the sealing pressure transmission ring between the sealing pressure application ring and the sealing sleeve portion has been modified in cross-section.

In the embodiment of FIG. 5, the sealing pressure application ring 17 is provided with a circular recess 18 and the sealing sleeve portion 7 is provided with a circular recess 19 both recesses 18 and 19 being of rectangular configuration when regarded in a cross-sectional plane containing the axis X. A rectangular sealing pressure transmission or connection ring 20 is accommodated within the recesses 18 and 19.

Figure 6:
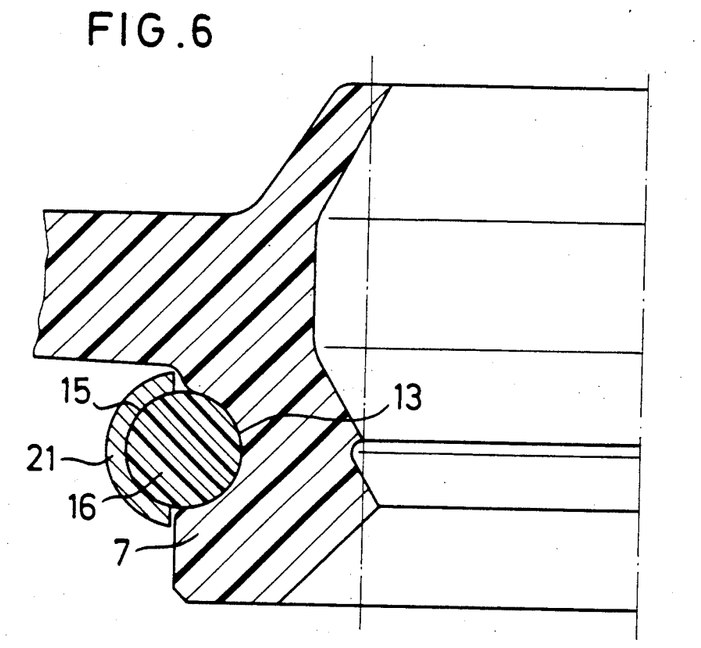
FIG. 6 shows an embodiment similar to the embodiment of FIG. 4 in which the profile of the sealing pressure application ring has been modified.

FIG. 6 shows a very economic embodiment of a stiff and non-extensible sealing pressure application ring 21. This pressure application ring 21 is a sheet metal ring having a semi-circular cross-section and a radially inwardly open recess 15. An O-ring 16 is accommodated within the recess 15 and within a recess 13 of the sealing sleeve portion 7. The pressure transmission ring 16 transmits a radial pressure from the sealing pressure application ring 21 onto the sealing sleeve portion 7.

Figure 7:
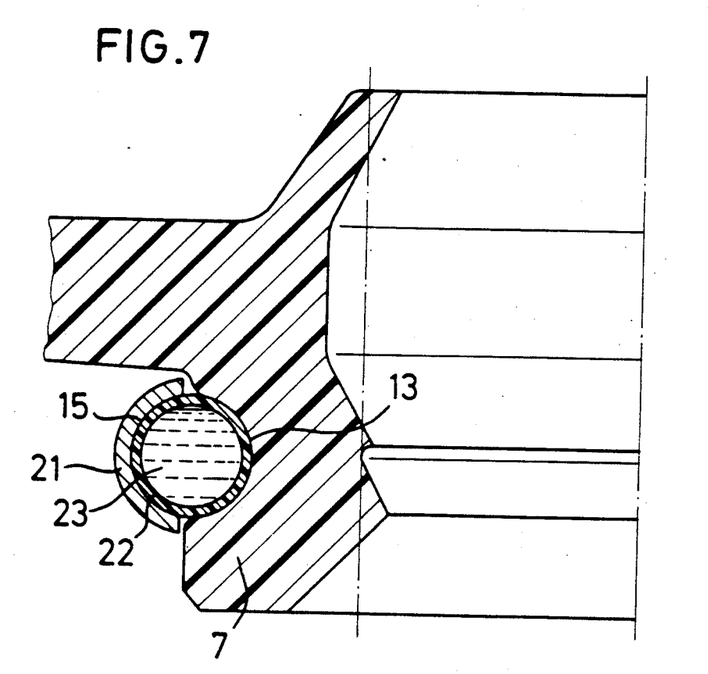
FIG. 7 shows an embodiment in which the sealing pressure transmission ring has a hollow cross-section and is filled with a temperature-sensitive medium.

According to the embodiment of FIG. 7, the sealing pressure transmission ring 22 has a hollow cross-sectional area and is filled with a temperature-sensitive liquid (23). The liquid is such that it becomes radially stiff at low temperatures of e.g. −40° C. Alternatively, a liquid may be used which has an increased specific volume at low temperatures.

Figure 8:
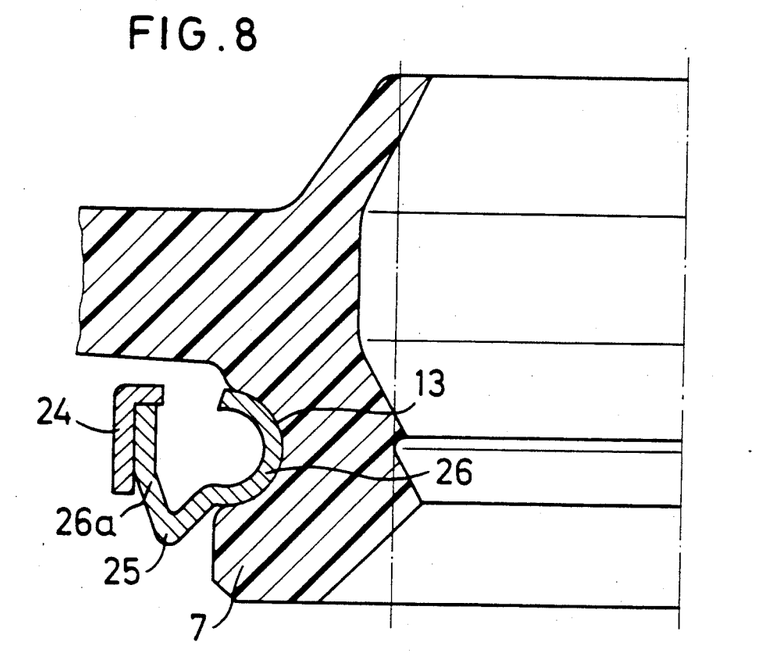
FIG. 8 shows an embodiment in which a sheet material sealing pressure transmission ring has been located between the sealing pressure application ring and the sealing sleeve portion and FIG. 9 shows an embodiment in which both a sheet metal sealing pressure transmission ring and an elastomeric sealing pressure transmission ring have been interposed between the sealing pressure application ring and the sealing sleeve portion.

In the embodiment of FIG. 8, a pressure transmission ring 25 is provided between the sealing pressure application ring 24 and the sealing sleeve portion 7. The sealing pressure application ring 24 is again closed and stiff or at least non-extensible in circumferential direction. The pressure transmission 25 comprises two legs 26 and 26a. The leg 26a is supported by the sealing pressure application ring 24, whereas the leg 26 engages into a radially outwardly open annular recess 13 of the sealing sleeve portion 7. The legs 26a and 26 can be approached towards each other by radial pressure. These two legs may be radially precompressed towards each other. So they can maintain a high sealing pressure under all working conditions.

Figure 9:
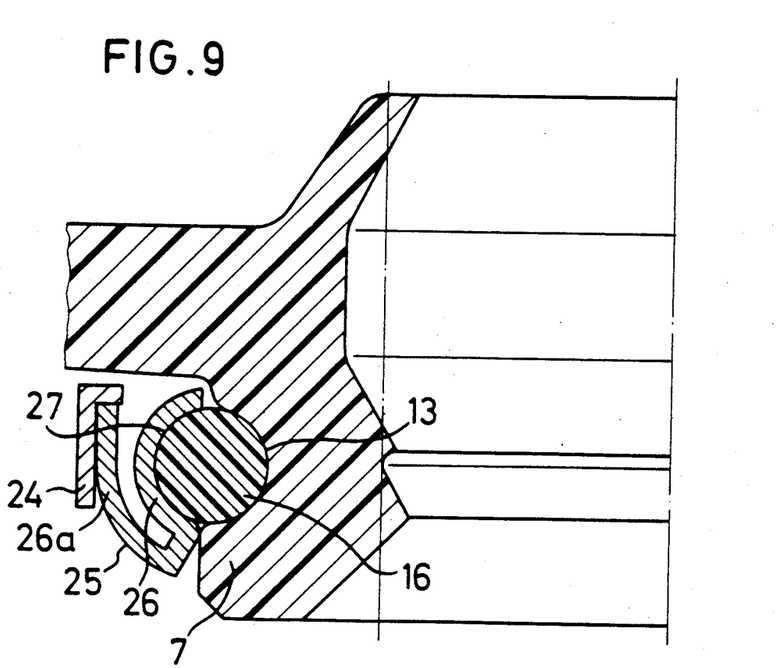

In the embodiment of FIG. 9, a sheet metal pressure transmission ring 25 and a O-ring 16 also functioning as a sealing pressure transmission ring are interposed between the sealing pressure application ring 24 and the sealing sleeve portion 7. The two legs 26 and 26a may again be elastically movable towards each other and radially precompressed towards each other. The O-ring 16 engages in a radially outwardly open annular recess 13 of the sealing sleeve portion 7 and into an annular recess 27 of the leg 26.

In all embodiments the sealing pressure application ring is preferably stiff and preferably made of metallic material. The structural stiffness of the pressure application ring is, however, not necessary. It is sufficient, if the pressure application ring is substantially non-extensible in circumferential direction by the circumferential tensional forces which occur in operation. So it is possible to make the sealing pressure application ring also of a plastic material.

It is essential that the sealing pressure application ring is radially movable and is so stiff against circumferential extension or elongation that it can provide a high radial sealing pressure at low temperatures.

Specific forms of embodiment of the invention have been represented and described in order to illustrate the use of the principles of the invention. Of course, the invention can also be realised in other ways without departing from these principles. The reference numbers in the claims serve only for facilitation of understanding and are not to be understood as a limitation.

We claim:

1. A cylinder piston rod unit comprising a cylinder member (4) having an axis (X) and two ends, a piston rod guiding and sealing unit (C) adjacent at least one of said two ends and a piston rod member (2) axially extending through said piston rod guiding and sealing unit (C), said piston rod guiding and sealing unit (C) comprising at least one sealing ring member (5), said sealing ring member (5) being axially fastened with respect to said one end of said cylinder member (4), said sealing ring member (5) having a substantially axially extending sealing sleeve portion (7) of elastomeric material surrounding said piston rod member (2), said sealing sleeve portion (7) having a radially inner sealing face (7a) sealingly engaging an external cylindrical face (2a) of said piston rod member (2), a closed sealing pressure application ring (11) being mounted on said sealing sleeve portion (7) radially outwards of said radially inner sealing face (7a), said sealing pressure application ring (11) being free for radial movement, said sealing pressure application ring (11) being subject to a circumferential tensional force at least in the lower part of a range of operational temperatures of said sealing sleeve portion (7), said circumferential tensional force maintaining a radial sealing pressure between said radially inner sealing face (7a) of said sealing sleeve portion (7) and said external cylindrical face (2a) of said piston rod member (2), said sealing pressure application ring (11) being substantially non-extensible by said circumferential tensional force.

2. A cylinder piston rod unit as set forth in claim 1, said sealing pressure application ring (11) having a radially inner surface (11a) engaging a radially outer surface (7b) of said sealing sleeve portion (7).

3. A cylinder piston rod unit as set forth in claim 1, said sealing pressure application ring (11) having a radially outer surface (11b), said radially outer surface (11b) being radially spaced from a surrounding rigid surface of one of said cylinder members (4) and said piston rod guiding and sealing unit (C).

4. A cylinder piston rod unit as set forth in claim 1, said circumferential tensional force within said sealing pressure application ring (11) being substantially reduced in an upper part of said range of operational temperatures.

5. A cylinder piston rod unit as set forth in claim 1, said closed sealing pressure application ring (11) being a stiff metallic ring.

6. A cylinder piston rod unit as set forth in claim 1, said sealing sleeve portion (7) being made of a fluorine caoutchouc.

7. A cylinder piston rod unit as set forth in claim 1, said sealing ring member (5) being integrally made of an elastomeric material, preferably of a fluorine caoutchouc.

8. A cylinder piston rod unit as set forth in claim 1, said radially inner sealing face (7a) of said sealing sleeve portion (7) having at least one radially inwardly directed annular sealing lip (8,9).

9. A cylinder piston rod unit as set forth in claim 1, said sealing ring member (5) having a stripper lip (10) engaging said external cylindrical face (2a) of said piston rod member (2) and axially spaced from said radially inner sealing face (7a) of said sealing sleeve portion (7).

10. A cylinder piston rod unit as set forth in claim 1, said sealing ring member (5) having a radially outwardly directed flange portion (6), said flange portion (6) being radially and axially fastened to at least one of said piston rod guiding and sealing unit (5) and said cylinder member (4).

11. A cylinder piston rod unit as set forth in claim 10, said sealing sleeve portion (7) extending axially inwards from said radially outwardly directed flange portion (6) towards a cavity (31) within said cylinder member (4).

12. A cylinder piston rod unit as set forth in claim 10, said radially outwardly directed flange portion (6) being provided with a stiffening disc (34), said stiffening disc (34) being separated from said sealing pressure application ring (11).

13. A cylinder piston rod unit as set forth in claim 1, said sealing pressure application ring (11) radially inwardly directed projection (12), said projection (12) engaging a radially outwardly open annular recess (13) of said sealing sleeve portion (7).

14. A cylinder piston rod unit as set forth in claim 1, said sealing pressure application ring (11) having a radially inwardly open annular recess (15), said recess (15) accommodating a radially outwardly directed annular projection (14) of said sealing sleeve portion (7).

15. A cylinder piston rod unit as set forth in claim 1, a pressure transmission ring (16) being provided radially between said sealing pressure application ring (11) and said sealing sleeve portion (7).

16. A cylinder piston rod unit as set forth in claim 15, said pressure transmission ring (16) being accommodated in radially oppositely directed respective annular recesses (15,13) of said sealing pressure application ring (11) and said sealing sleeve portion (7).

17. A cylinder piston rod unit as set forth in claim 15, said pressure transmission ring (16) having a circular cross-sectional area when regarded in a plane of section containing the axis of said cylinder member (4).

18. A cylinder piston rod unit as set forth in claim 15, said pressure transmission ring (20) having a substantially rectangular cross-sectional area when regarded in a plane of section containing said axis (X) of said cylinder member (4).

19. A cylinder piston rod unit as set forth in claim 15, said pressure transmission ring (16) being made of elastomeric material.

20. A cylinder piston rod unit as set forth in claim 15, said pressure transmission ring (22) having a hollow toroidal cross-sectional area and being filled with a temperature-sensitive filling medium.

21. A cylinder piston rod unit as set forth in claim 20, said filling medium being such as to transmit an increased radial pressure to said sealing sleeve portion (7) in the lower part of said range of operational temperatures as compared with an upper part of said range of operational temperatures.

22. A cylinder piston rod unit as set forth in claim 21, said filling medium having an increased radial stiffness in said lower part of operational temperatures as compared with an upper part of said range of operational temperatures.

23. A cylinder piston rod unit as set forth in claim 21, said filling medium having an increased specific volume in said lower part of said range of operational temperatures as compared with said upper part.

24. A cylinder piston rod unit as set forth in claim 15, said pressure transmission ring (25) being a sheet material ring (25) having a double leg profile when regarded in a plane of section containing said axis (X) of said cylinder member (4), one (26a) of said legs (26,26a) acting onto said sealing pressure application ring (24) and the other one (26) of said legs (26,26a) acting onto said sealing sleeve portion (7), said legs being elastically movable towards each other in radial direction.

* * * * *

UNITED STATES PATENT AND TRADEMARK OFFICE
CERTIFICATE OF CORRECTION

PATENT NO.  : 4,987,826

DATED       : January 29, 1991

INVENTOR(S) : Norbert Deppert and Helmut Umlauf

It is certified that error appears in the above-identified patent and that said Letters Patent is hereby corrected as shown below:

Col. 1, line 38, "which" should read --high--;
Col. 6, line 23, "11of" should read --11a of--;
Col. 6, line 51, "outwardly/direction" should read --outwardly directed--;
Col. 9, line 9, after "(11)" insert --having an annular--.

Signed and Sealed this

Twenty-third Day of June, 1992

Attest:

DOUGLAS B. COMER

*Attesting Officer*  *Acting Commissioner of Patents and Trademarks*